Patented Nov. 4, 1930

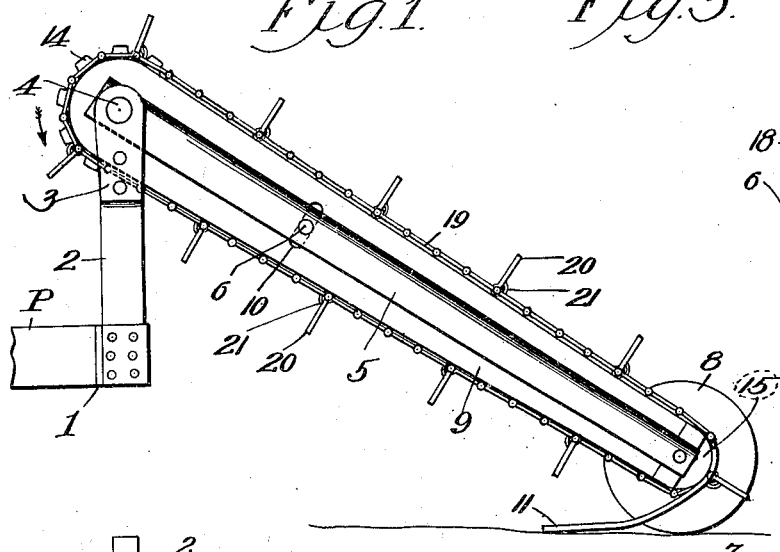
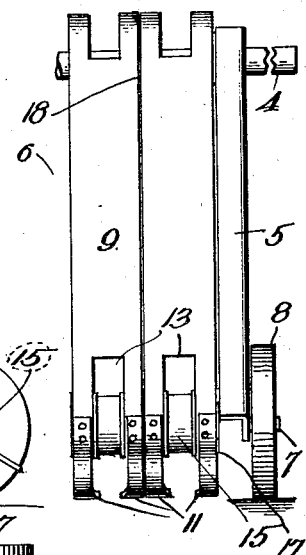
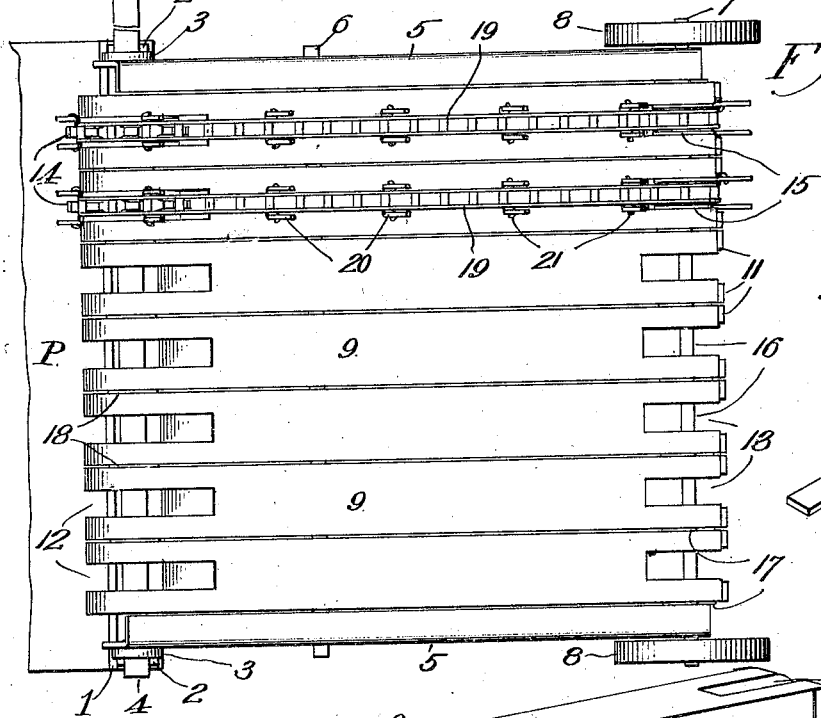
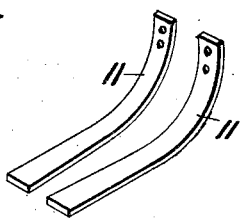
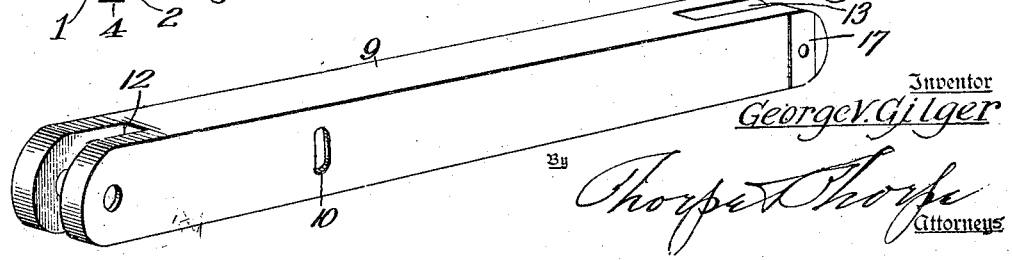

1,780,472

UNITED STATES PATENT OFFICE

GEORGE V. GILGER, OF CIMARRON, KANSAS, ASSIGNOR OF ONE-HALF TO HARVEY B. MARCUM, OF NEWTON, KANSAS

PICK-UP ATTACHMENT FOR COMBINES

Application filed October 21, 1929. Serial No. 401,140.

This invention relates to grain pick-up apparatus and has for its object to provide a pick-up attachment designed especially for use on machines generally known as combines, and adapted primarily for gathering up grain from windrows and depositing it upon the platforms of combines.

A further object is to provide a machine composed of any number of pick-up units, each free to swing up or down to accommodate ground surface irregularities and therefore operate effectively in gathering up and delivering practically all grain lying in its path without necessitating traveling over the same ground a second time.

A still further object is to produce a pick-up attachment provided with a framework inclining forwardly and downwardly and equipped with ground-engaging means for maintaining the front end of the framework at substantially the same distance above the ground regardless of irregularities in the surface thereof and for limiting the up and down movements of the pick-up elements.

A still further object is to produce a pick-up attachment of the character set forth which can be easily and quickly applied to or removed from a combine or the like; which can easily and quickly be varied in width to accommodate the particular machine to which it is to be applied; and which is of simple, strong, durable and comparatively inexpensive construction.

With the objects mentioned in view, the invention consists in certain novel and useful features of construction and combinations of parts as hereinafter described and claimed; and in order that it may be fully understood, reference is to be had to the accompanying drawing, in which:

Figure 1 is a side elevation of a part of a combine equipped with a pick-up attachment embodying the invention, the near ground wheel of the latter being omitted.

Figure 2 is a top plan view but with only a pair of the pick-up units in complete form.

Figure 3 is a fragmentary front view of the pick-up attachment minus certain features thereof.

Figure 4 is a detail perspective view of the swing arm of a pick-up unit.

Figure 5 is a detail perspective view of a pair of shoes for use on each pick-up unit arm for holding the front end of the latter a suitable distance above the ground.

Referring now to the drawing in detail, P indicates the platform of a combine or equivalent machine, which may be employed in the harvesting of grain. Detachably secured to the front edge of the platform is a bar 1 and secured to the latter at or near the ends is a pair of posts 2 equipped at the upper end with bearing plates 3, for a transverse shaft 4, adapted to be equipped with a wheel (not shown) to which power may be applied in any suitable or conventional manner from a moving part of the combine, the shaft being adapted to be driven in the direction indicated by the arrow, Figure 1.

The framework of the attachment is constructed as follows: 5 is a pair of side bars, preferably in the form of angle irons and pivoted at their rear ends on the shaft 4 and connected intermediate their ends by a cross rod 6, and each side bar 5 is equipped at its front end with a laterally-projecting stub-shaft 7, forming a journal for a ground-engaging wheel 8 whereby the front end of the framework is maintained at a substantially uniform distance above the ground at all times, it being of course understood that an equivalent of the wheels 8, in the form of runners, not shown, may be employed.

Arranged side by side between the side bars of the frame are any desired number of pick-up units, constructed as follows: Swing arms 9, preferably of metal and hollow, are pivotally mounted at their rear ends on the shaft 4, and provided at an intermediate point with slots 10 through which the tie rod 6 extends, the length of the slots determining the extent of up and down pivotal movement of the swing arms, it being noted that the swing arms are independent of each other so that any one of them may swing up or down without affecting the position of any other swing arm, this action being necessary to accommodate the machine for effective operation over an irregular ground surface. It will be noted however, that each swing arm is provided at its front end with a pair spaced shoes 11 of resilient metal, which drag upon the ground and thus maintain the front ends of the respective swing arms well above the ground at all times.

The swing arms are provided at their upper ends with vertical bifurcations 12 and at the lower ends with similar bifurcations 13, and fitting in the former bifurcations and mounted rigidly on shaft 4, sprocket wheels 14. Grooved guide rollers 15 fit in the bifurcations 13, and are journaled upon pins 16 extending across the bifurcations 13 and respectively carried by the individual swing arms, it being noted in this connection that for the purpose of minimizing friction, the swing arms have slight spacing projections 17 at their front ends, and are spaced apart at their rear ends by thin washers 18 mounted on shaft 4, the arrangement being such that as the swing arms move up and down in their travel, the spacing projections of adjacent arms will afford the only frictional contact between such arms at the front ends, and the washers 18 the only frictional contact at their rear ends, it being desirable that this spacing of the arms shall be made as narrow as possible so that it shall be impossible for grain to wedge between the arms and interfere with their freedom of movement.

To effect the actual pick-up and conveying operation, the sprocket wheel and roller of each pick-up arm is connected by an endless sprocket chain 19 which rides against or contiguous to the upper and lower sides of the arm. At suitable intervals, the endless chain or conveyor is provided at opposite sides with fingers 20 which project normally at right angles substantially, to the chain. The fingers may be of any type or construction which will maintain them in the position mentioned, under the pressure of spring 21 or the like attached to the chain and bearing against the fingers, provided the fingers may be capable of yielding backward, as they move downwardly and forwardly, if they encounter a rock or other obstruction in their path. In such forward movement at the lower sides of the respective arms, they in effect dig into the mass of grain lying in their path and pick up a charge therefrom and carry it along the upper side of the arm and eventually discharge it down upon the platform P, all of the arms operating in like manner and being spaced sufficiently close together to practically pick up all of the grain in the windrow in one passage thereover, it being noted that the respective shoes are so spaced that the fingers can readily pass between them as they attain a position in their forward travel adjacent the rollers 15, and the shoes, as hereinbefore mentioned, hold the respective pick-up arms a sufficient distance above the ground to enable the fingers to pass under the rollers without material repression by contact with the ground though, as stated, the fingers are capable of such repression to guard against injury or breakage in the event they encounter a rock or surface of the ground projecting too high to be cleared in the ordinary travel of the fingers when standing at right angles to the chain or conveyors.

It will be apparent with the construction described, that the operation of the attachment is entirely automatic, and that the width of the attachment can be varied to accommodate the width of the window or the combine, as the removal of one of the side bars of the frame can be readily effected to permit of the insertion of an additional pick-up unit or units, or of the removal of one or more of such units, the side bar being replaced as readily.

From the above description, it will be apparent that I have produced an automatic pick-up attachment for combines and the like, which embodies the features of advantage set forth as desirable in the statement of the object of the invention, and which may be modified in various particulars within the principle of construction and mode of operation involved and the spirit and scope of the appended claims.

I claim:

1. A pick-up attachment, comprising a framework pivotally supported at its rear end, for up and down movement, and provided at its front end with ground-engaging devices, a series of downwardly and forwardly sloping swing arms pivotally supported at their rear ends for independent swinging movement in a vertical plane, ground-engaging shoes holding the front ends of the respective swing arms above the ground, a driven shaft journaled in the framework, wheels thereon, endless conveyors extending along the top and bottom of the swing arms respectively and engaging said wheels, and fingers on said conveyors for picking up grain from the ground and dumping it at the rear ends of said swing arms.

2. A pick-up attachment, comprising a framework pivotally supported at its rear end, for up and down movement, and provided at its front end with ground-engaging devices, a series of downwardly and forwardly sloping swing arms pivotally supported at their rear ends for independent swinging movement in a vertical plane, ground-engaging shoes holding the front ends of the respective swing arms above the ground, a driven shaft journaled in the framework, wheels thereon, endless conveyors extending along the top and bottom of the swing arms respectively and engaging said wheels, fingers on said conveyors for picking up grain from the ground and dumping it at the rear ends of said swing arms, and a tie rod carried by and extending from one side of the framework to the other and occupying a position in the path of the swing arms to limit upward movement thereof.

3. A pick-up attachment, comprising a framework consisting of side bars having ground-engaging devices at their front ends and pivotally supported at their rear ends for up and down movement, one or more swing arms between said side bars and pivotally supported at their rear ends, spaced ground-engaging shoes attached to the front end of each swing arm to hold such end clear of the ground, a driven wheel in line with each swing arm and mounted coaxially with the axis of movement thereof, a roller at the front end of each swing arm, and a conveyor engaging said driven wheel and roller and extending longitudinally of and around the respective swing arm, and provided with spaced teeth for passing successively between the shoes and gathering up grain and conveying it upwardly upon the swing arm and eventually discharging it rearward thereof.

4. A pick-up attachment, comprising a framework consisting of side bars having ground-engaging devices at their front ends and pivotally supported at their rear ends for up and down movement, one or more swing arms between said side bars and pivotally supported at their rear ends, spaced ground-engaging shoes attached to the front end of each swing arm to hold such end clear of the ground, a driven wheel in line with each swing arm and mounted coaxially with the axis of movement thereof, a roller at the front end of each swing arm, and a conveyor engaging said driven wheel and roller and extending longitudinally of and around the respective swing arm, and provided with spaced teeth for passing successively between the shoes and gathering up grain and conveying it upwardly upon the swing arm and eventually discharging it rearward thereof; said swing arms having slots, and a tie rod extending from one side of the frame to the other and extending through said slots.

5. The combination with a platform of a harvesting machine, of a pair of standards mounted on said platform, a driven transverse shaft journaled in said standard, a pair of side bars pivoted on the shaft extending downwardly and forwardly and provided with ground-engaging devices at their front ends, a tie rod connecting the side bars at an intermediate point of their length, series of swing arms paralleling and between said side bars and pivoted at their rear ends on said shaft and each provided at its front end with a pair of spaced ground-engaging shoes; each swing arm having a slot engaging the tie rod and front and rear end vertical bifurcations, sprocket wheels on said shaft within the said rear end bifurcations, rollers suitably journaled in the front end bifurcations of the swing arms, endless chains engaging the respective sprocket wheels and rollers of said swing arms, and fingers projecting from said chains and adapted to pick up grain and carry it up on the swing arms and discharge it at the rear ends of the latter down upon the platform.

In testimony whereof I affix my signature.

GEORGE V. GILGER.